Figure 1:
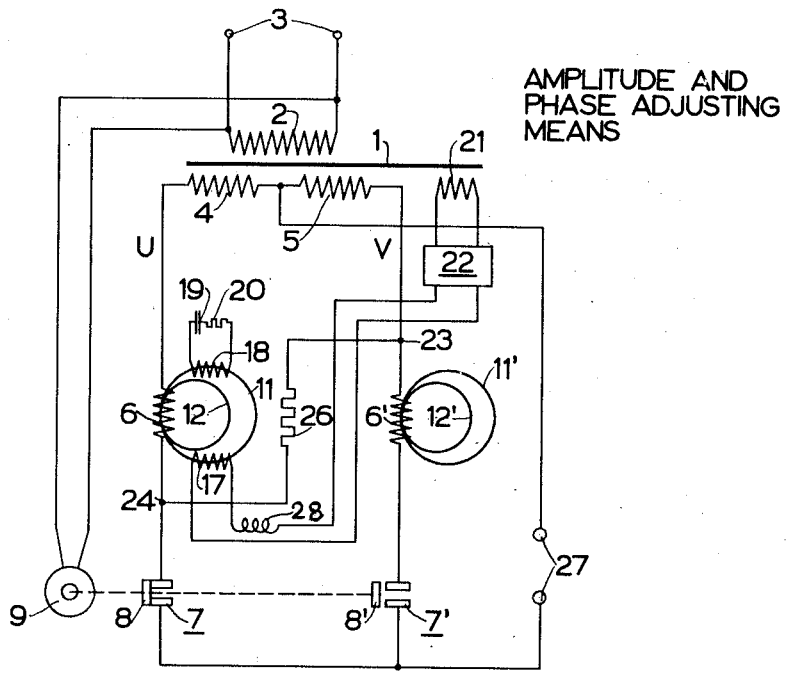

Patented Feb. 5, 1952

2,584,535

UNITED STATES PATENT OFFICE 2,584,535

SYSTEM FOR REDUCING CONTACT ARCING IN SYNCHRONOUS SWITCHING APPARATUS

Michael Belamin, Nuremberg, Germany, assignor to Siemens-Schuckertwerke, Aktiengesellschaft, Berlin-Siemensstadt, Germany, a corporation of Germany Application December 4, 1950, Serial No. 199,005
In Germany October 1, 1948

7 Claims. (Cl. 175—294)

The invention relates to synchronous contact apparatus particularly for the control or conversion of alternating currents.

It is known to connect a commutating reactor in series with the contacts of such apparatus in order to flatten the current curve near its zero passages thus providing for periodically recurring intervals of low current magnitude in which the contacts can open and close under minimum or zero current load. It has been proposed to employ two such series reactors, one—the "break reactor"—for providing a proper low-current step for the contact opening operation and the other—the "make reactor"—for securing optimum conditions during the low-current step for the contact closing operation.

Such saturable commutating reactors have been premagnetized, and it has been proposed to make the premagnetization "elastic" by connecting a premagnetizing winding of the reactor in a cross-phase circuit on which an additional voltage is impressed in order to reduce as much as possible the current at the opening moment of the contacts. The premagnetizing cross-phase current is either applied to a pre-excitation bias winding of the reactor or it is directly applied to the main reactor winding.

Although the elastic premagnetization, as regards the adaptation of the premagnetizing effect, has considerable advantages, it has not been possible to adjust this premagnetization in such a manner that small error currents, i. e. non-compensated residual currents flowing through the opening contacts, are completely eliminated under all occurring operating conditions of a contact converter. When the contacts open, this remaining current is suddenly interrupted. Voltages are then induced in all inductances of the cross-phase circuit, such as in the windings of the main or break reactor, the windings of the make reactor, the premagnetizing transformer which superimposes an auxiliary voltage on the cross-phase circuit as well as in any other inductive resistance in that circuit. The resulting high frequency oscillations or voltage peaks, though as such not powerful enough to damage the contacts, may ionize the air so that the small instantaneous operating voltage then existing between the separating contacts may discharge through an arc. This reduces the useful lifetime of the contacts.

It is, therefore, an object of the invention to improve synchronous contact apparatus with an elastic premagnetization of series reactors by cross-phase currents in such a manner as to reduce the peak voltages below the value of the arcing or sparking voltage or to completely obviate such peaks, thereby preventing the occurrence of damage to the contacts.

To this end and in accordance with a feature of the invention, I subdivide in apparatus of the above-mentioned type the premagnetizing means of the commutating reactor into a main circuit energized by stabilized sinusoidal current and an auxiliary circuit which is energized by the cross-phase current and is substantially free of inductive impedance, for instance, by the application of a bifilar resistance member and bifilar current leads.

Figure 2:
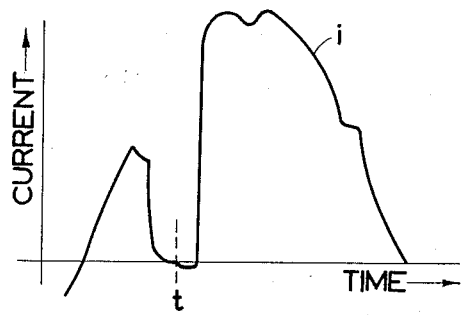

The foregoing and more specific features of the invention will be apparent from the following description of the embodiment exemplified by the drawing, in which Figure 1 shows schematically the circuit diagram of a bi-phase contact rectifier according to the invention, and Figure 2 is an explanatory coordinate diagram representing the cross-phase current versus time.

The illustrated contact rectifier is energized from a power transformer 1 whose primary 2 has terminals 3 for connection to an alternating-current line. The transformer has secondary windings 4 and 5 connected with the respective phase circuit U and V. The reactance winding 6 of a commutating reactor device is connected in phase circuit U in series with a contact device 7 whose movable contact member 8 is actuated by a synchronous motor 9 to periodically open and close the phase circuit in synchronism with the current to be converted and at moments near the current zero passages. These opening and closing moments occur during an interval of time in which the current wave is flattened by the sudden increase in reactance of winding 6 due to the fact that the device becomes unsaturated at low instantaneous current values. The commutating reactor device has two saturable magnet cores 11 and 12. Core 11 is provided for securing optimum conditions during the break stop, i. e. during that interval of time in which the current curve is flattened and the contact 8 actuated to open the circuit. Core 12 is designed to produce similarly favorable conditions during the make step, i. e. when the contact 8 closes. The break reactor core 11 has two biasing windings 17 and 18. Winding 18 has an auxiliary function. Its circuit extends through a capacitor 19 and a resistor 20 and serves to improve the shape of the low-current step during the break interval. Winding 17 is connected to a source of substantially sinusoidal current. In the illustrated embodiment, this source is shown as an auxiliary secondary winding 21 of the power transformer 1. If desired, amplitude and phase adjusting circuit elements, schematically represented at 22, may be interposed between secondary 21 and winding 17. A stabilizing reactor 28 may be series connected in the circuit of coil 17.

A cross-phase circuit is connected between a point 23 at the transformer side of phase circuit V and a point 24 located between the reactor winding 6 and the contact 7 of phase circuit U. This cross circuit is as purely ohmic as possible. Its impedance member 26 consists, for instance, of a resistor whose windings and leads are bifilar. The cross circuit is not impressed by additional voltage.

It will be recognized that the premagnetizing means of the saturable commutation reactor 11 comprise two excitation circuits, namely a main excitation circuit connected to bias coil 17 and carrying a stabilized sinusoidal current, and an auxiliary excitation circuit consisting of the inductance-free cross-phase connection between points 23 and 24. Any cross-phase current flowing through the auxiliary excitation circuit at the opening moment of contact 8 passes through the reactance winding 6.

The phase circuit V is designed in a similar manner. It includes the reactance winding 6' of a saturable reactor device in series with a contact device 7' whose movable contact member 8' is actuated by motor 9 in the necessary phase position relative to contact 8 to secure the desired commutation and rectification. The saturable reactor device for phase circuit V has a break core 11' and a make core 12', the latter being equipped with two bias windings (not shown) which are excited in the same manner as the above-described bias windings appertaining to phase circuit U.

When contact device 7 opens, any remaining error current is immediately taken up by the cross-phase circuit of resistor 26 so that the magnetizing current then flowing through winding 6 of the make reactor 12 does not change appreciably. Consequently, no undesired voltage peaks are produced in the contact-opening moment. In the diagram of Figure 2, the cross current flowing through the substantially purely ohmic cross-phase circuit is represented by the curve $i$. The opening moment of contact 8 is denoted by the time point $t$. It will be recognized that at the opening moment $t$ the residual current then still effective in phase U is immediately shifted into the cross-phase circuit so that current $i$ steeply decreases at that moment to a small negative value. Due to this diversion of the current flow at the opening moment, the voltage across the separating contacts is minimized to such an extent that there is no arcing or sparking tendency.

During the contact-opening and current flattening intervals of each phase circuit, the pertaining reactor, then being unsaturated, has a sufficiently high reactance to absorb virtually the entire phase voltage. During other intervals of operation, when the reactor is saturated, its impedance is small or negligible so that a loss current might flow through the cross-phase circuit. Therefore, to avoid unnecessary losses, the premagnetizing resistance of resistor 26 in the cross circuit should be as large as possible. On the other hand, this resistance is to be dimensioned so that the voltage drop caused in the resistor 26 due to the diverted residual current, which voltage drop also represents the suddenly rising voltage at the contacts in the opening moment, does not exceed about ten volts.

The invention is also applicable to three-phase or other polyphase apparatus, the cross-phase circuits for the auxiliary pre-excitation of the reactor being then connected between the various phases in a cyclical manner.

I claim:

1. In electric switching apparatus having a plurality of parallel connected and mutually phase-displaced phase circuits and having in each of said phase circuits a saturable commutation reactor and, in series therewith, a contact means synchronous with the phase current to open said phase circuit near a current zero passage, said reactor having premagnetizing means comprising a main excitation circuit of stabilized sinusoidal current and an auxiliary excitation circuit, said auxiliary excitation circuit being substantially free of inductance and extending from a point of one phase circuit between reactor and contact means to a point of another phase circuit at the reactor side remote from the contact means.

2. In electric switching apparatus according to claim 1, said auxiliary excitation circuit having resistance means and leads of substantially purely ohmic resistance exclusively.

3. In electric switching apparatus according to claim 1, said auxiliary excitation circuit having a bifilar resistance means and bifilar leads so as to be as free of inductance as possible.

4. Electric switching apparatus, comprising a plurality of parallel connected and mutually phase-displaced phase circuits and having in each of said phase circuits a contact means synchronous with the current of the phase circuit to open the phase circuit near a current zero passage, a plurality of saturable commutation reactors each having a magnetizable core and two windings on said core, one of said windings being series connected with one of said contact means in one of said respective phase circuits, a pre-excitation circuit of stable sinusoidal current connected with said other winding, and a cross-phase circuit having substantially non-inductive resistance and extending from a point between said one reactor winding and said contactor means of one phase circuit to a point at the reactor side remote from said contact means of another phase-circuit.

5. Electric switching apparatus, comprising a transformer having a plurality of parallel connected and mutually phase-displaced secondary circuits, a corresponding plurality of contact means connected in said respective circuits, said plurality of contactor means being synchronous with the currents in said respective secondary circuits to open each circuit near a current zero passage, a corresponding plurality of commutating reactors each having a reactance winding series connected between said transformer and one of said respective contact means, each of said reactors having a premagnetizing bias winding, and a cross-phase impedance circuit extending from a point between the reactor and contactor means of each of said secondary circuits to a transformer-side point of another one of said secondary circuits, said cross-phase circuit having a substantially non-inductive resistance.

6. Electric switching apparatus, comprising a transformer having a plurality of differently-phased secondary circuits, a corresponding plurality of contact means connected in said respective circuits and having respective contact control means synchronous with the currents of said respective circuits to open each contact near a current zero passage, a corresponding plurality of commutating reactors each having a main winding series connected between said transformer and one of said respective contact means, each of said reactors having a break core and a make core inductively linked with said main winding and having a premagnetizing bias winding inductively linked only with said break core, a pre-excitation circuit of stable sinusoidal current, connected with said bias winding, and a cross-phase circuit extending from a point between the reactor and contact means of each of said circuits to a transformer-side point of another one of said circuits, said cross-phase circuit having a substantially non-inductive resistance.

7. Electric switching apparatus, comprising a load circuit and a plurality of phase circuits for mutually phase-displaced currents respectively, said phase circuits being parallel connected to said load circuit, each of said phase circuits having a contact means and a saturable commutation reactor series connected with each other, said plurality of contact means having respective contact control means synchronous with the currents of said respective phase circuits to open each phase circuit near a current zero passage, each of said reactors having a break core and a make core and having a premagnetizing bias winding on said break core, a pre-excitation circuit of stable sinusoidal current connected with said bias winding, and a cross-phase circuit extending from a point between said reactor and said contact means of one phase circuit to a point at the reactor side remote from said contact means of another phase circuit, said cross-phase circuit having a substantially purely ohmic resistance and having at the opening moment of said contact means of said one phase circuit a voltage drop of at most about 10 volts.

MICHAEL BELAMIN.

REFERENCES CITED

The following references are of record in the file of this patent:

UNITED STATES PATENTS

| Number | Name | Date |
|---|---|---|
| 2,351,975 | Koppelmann | June 20, 1944 |
| 2,466,864 | Prati | Apr. 12, 1949 |
| 2,568,140 | Belamin | Sept. 8, 1951 |